United States Patent [19]

Tanaka et al.

[11] Patent Number: 5,027,305

[45] Date of Patent: Jun. 25, 1991

[54] INTERROGATING DEVICE FOR CHANGING THE PRIORITY OF THE INFERENCE RULES

[75] Inventors: Toshiyuki Tanaka; Nobuo Nakamura, both of Yamatokoriyama; Mutsuhiro Yamamoto, Nara, all of Japan

[73] Assignee: Sharp Kabushiki Kaisha, Tokyo, Japan

[21] Appl. No.: 278,577

[22] Filed: Dec. 1, 1988

[30] Foreign Application Priority Data

Dec. 3, 1987 [JP] Japan .................................. 62-307998

[51] Int. Cl.$^5$ ........................ G06F 15/36; G06F 15/18
[52] U.S. Cl. ................................... 364/513; 364/972.2
[58] Field of Search ......... 364/513, 300, 200 MS File, 364/900 MS File

[56] References Cited

U.S. PATENT DOCUMENTS

| | | | |
|---|---|---|---|
| 4,754,409 | 6/1988 | Ashford et al. | 364/513 |
| 4,754,410 | 6/1988 | Leech et al. | 364/513 |
| 4,763,277 | 8/1988 | Ashford et al. | 364/513 |
| 4,860,213 | 8/1989 | Bonissone | 364/513 |

Primary Examiner—Dale M. Shaw
Assistant Examiner—John A. Merecki

[57] ABSTRACT

An interrogating device which includes a rule memory for storing forward inference rules utilizable in a forward inference control system or backward inference rules utilizable in a backward inference control system, a working memory for storing facts, and a forward inference control section for adding or deleting a fact relative to the working memory according to the forward inference rules or a backward inference control section for conducting a search according to the backwad inference rules.

2 Claims, 5 Drawing Sheets

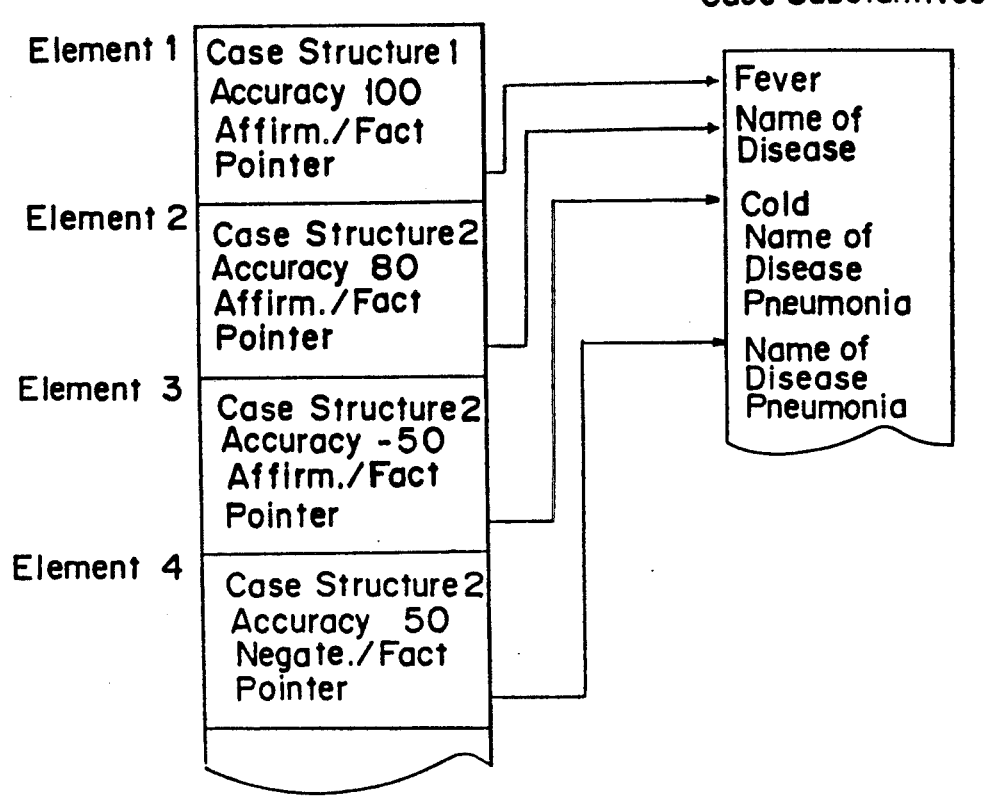
Fig. 2 Structure of facts stored in Memory 5
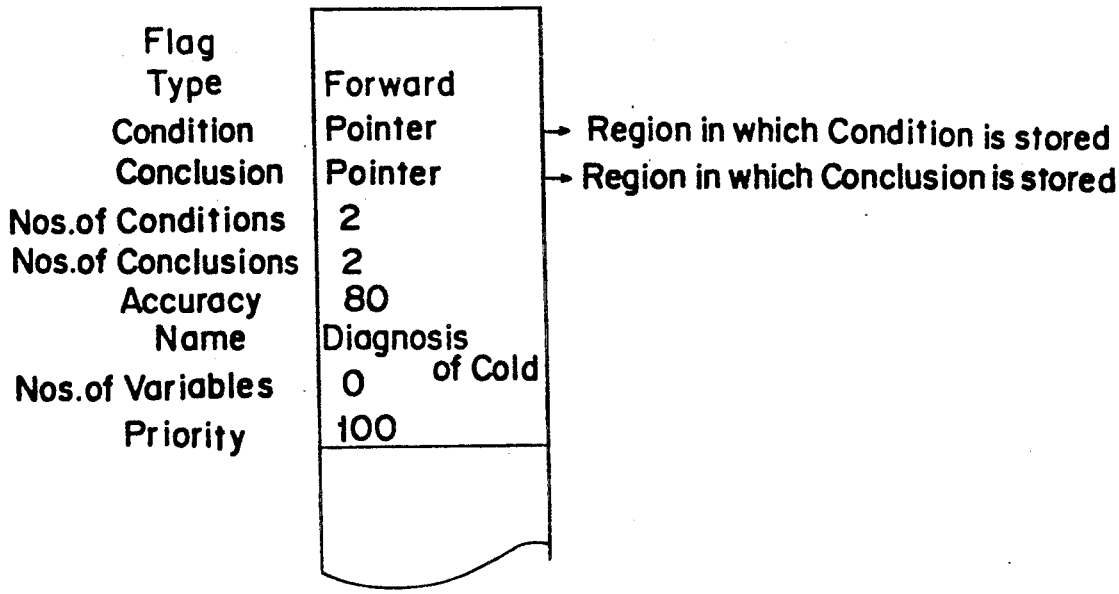
Fig. 3 Structure of Rule

Fig. 6

Conclusion Section

| Name of Action | Parameter |
|---|---|
| "PRIORITY" | Rule No. |
| "PRIORITY" | 20 |
| "ACTION END" | — |

Fig. 7

Conclusion Section

| Name of Action | Parameter |
|---|---|
| "EXCISE" | Rule No. |
| "ACTION END" | — |

Fig. 8

Conclusion Section

| Name of Action | Parameter |
|---|---|
| "RESUME" | Rule No. |
| "ACTION END" | — |

Fig. 9
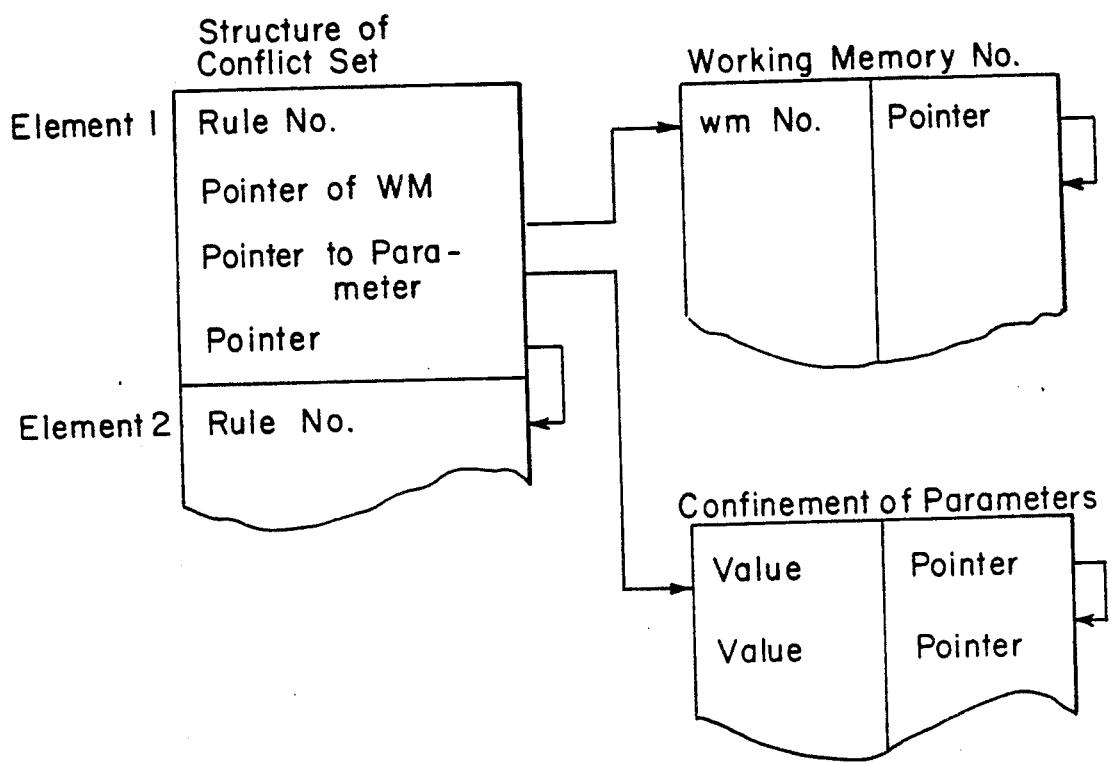
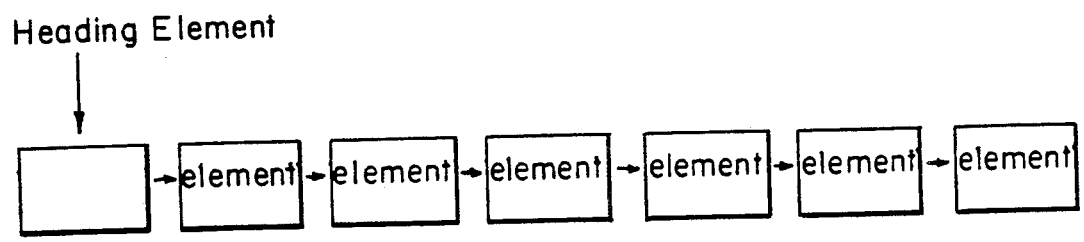
Fig. 10

INTERROGATING DEVICE FOR CHANGING THE PRIORITY OF THE INFERENCE RULES

BACKGROUND OF THE INVENTION

1. Field of the Invention

The present invention relates to an interrogating device based on a forward inference system or a backward inference system.

2. Description of the Related Art

In conventional interrogating devices, the priority of rules is determined beforehand and cannot be changed during the course of execution of an inference. Therefore, in order to solve the problem in which the priority of the rules changes dynamically, there is provided a special fact for use in controlling the change of the priority other than the ordinary fact so that the priority can be apparently changed. Also, although the deletion of the rules can be carried at a command level relative to the interrogating device, the detection cannot be carried out at an action level of the rules. Accordingly, where there is a rule which is used only under a special case, as is the case with the change of the priority of the rules as hereinabove described, a special fact for use in controlling the deletion of the rules is provided so that the rules can be apparently deleted. Because of this reason, the rules can be deleted at the time of executing a rule debug. However, once the rules are deleted they cannot be restored.

As hereinabove discussed, in the conventional art interrogating device, because the special facts for use in controlling the change of the priority and in controlling the deletion of the rules are required other than the ordinary facts so that, during the execution of the inference, the priority of the rules can be changed and the rules can be deleted, respectively, the device tends to be complicated. Because the rules cannot be restored once they are deleted the rules have to be prepared from the beginning where the inference is desired to be executed by using the rules which have been deleted. Also, in the interrogating device in which both the forward inference and the backward inference are employed, neither is available for the priority of the rules of the forward inference to be superseded by the rule of the backward inference so that the deletion and restoration of the rules can be accomplished.

SUMMARY OF THE INVENTION

An important object of the present invention is to provide an interrogating device of a type wherein the change in priority of the forward inference rules, the rule debug and the reexecution of the inference according to the rules which have been deleted can be easily accomplished by entering a command for changing the priority of the forward inference rules, the rule deletion and the rule restoration in the forward inference rules or the backward inference rules.

In order to accomplish the above described object, an embodiment of the present invention provides an interrogating device including a rule memory for storing forward inference rules to be utilized in a forward inference control system or a backward inference rule to be utilized in a backward inference control system, a working memory for storing facts, and a forward inference control section operable to add or delete a fact relative to the working memory according to the forward inference rules or a backward inference control section operable to conduct a search according to the backward inference rules. In this device, the degree of priority is added to the forward inference rules stored in the rule memory, and a predetermined rule of the forward or backward inference rules stored in the rule memory is added with a command for executing a change of the priority added to the forward inference rules, the deletion of the rules and the restoration of the rules. Whereby, in the forward inference control system, the change of the priority of the forward inference rules, the deletion of the rules and the restoration of the rules are enabled by the forward inference control section, or when the forward and backward inference control systems are both used, the change of the priority of the inference rules, the deletion of the rules and the restoration of the rules are enabled by the backward inference system.

According to an embodiment of the present invention, the interrogating device is supplied with the forward inference rules to be utilized in the forward inference control system and the inference rules and facts to be utilized in the backward inference control system which are subsequently stored in the rule memory and the working memory. At that time, the forward inference rules are stored in the rule memory in the form which is added with the priority. Also, the backward inference rules are stored in the rule memory in the form which is added with a command for initiating a change of the priority added to the forward inference rules, a deletion of the rules and a restoration of the rules, should the necessity arise. Accordingly, by the action of the forward inference rules and the backward inference rules, the change of the priority of the forward inference rules, the deletion of the rules and the restoration of the rules can be easily executed.

Also, according to an embodiment of the present invention, when the forward inference control system is used, the change of the priority of the forward inference rules, the deletion of the rules and the restoration of the rules can be accomplished by the forward inference control section. Yet, when the forward inference control system and the backward inference control system are both used, the change of the priority of the forward inference rules, the deletion of the rules and the restoration of the rules can also be accomplished by the backward inference control system.

BRIEF DESCRIPTION OF THE DRAWINGS

This and other objects and features of the present invention will become clear from the following description taken in conjunction with a preferred embodiment thereof with reference to the accompanying drawings, in which:

FIG. 2 is a diagram illustrating the structure of facts stored in a working memory;

FIG. 3 is a diagram illustrating the structure of rules stored in a rule storage unit;

FIG. 6 is a diagram illustrating a storage structure of actions during the change of the priority of the rules;

FIG. 7 is a diagram illustrating a storage structure of actions during the deletion of the rules;

FIG. 8 is a diagram illustrating a storage structure of actions during the restoration of the rules;

FIG. 9 is a diagram illustrating a storage structure of elements of a conflict set; and FIG. 10 is a diagram illustrating the elements of the conflict set linked together in a chain.

DETAILED DESCRIPTION OF THE EMBODIMENTS

Figure 1:
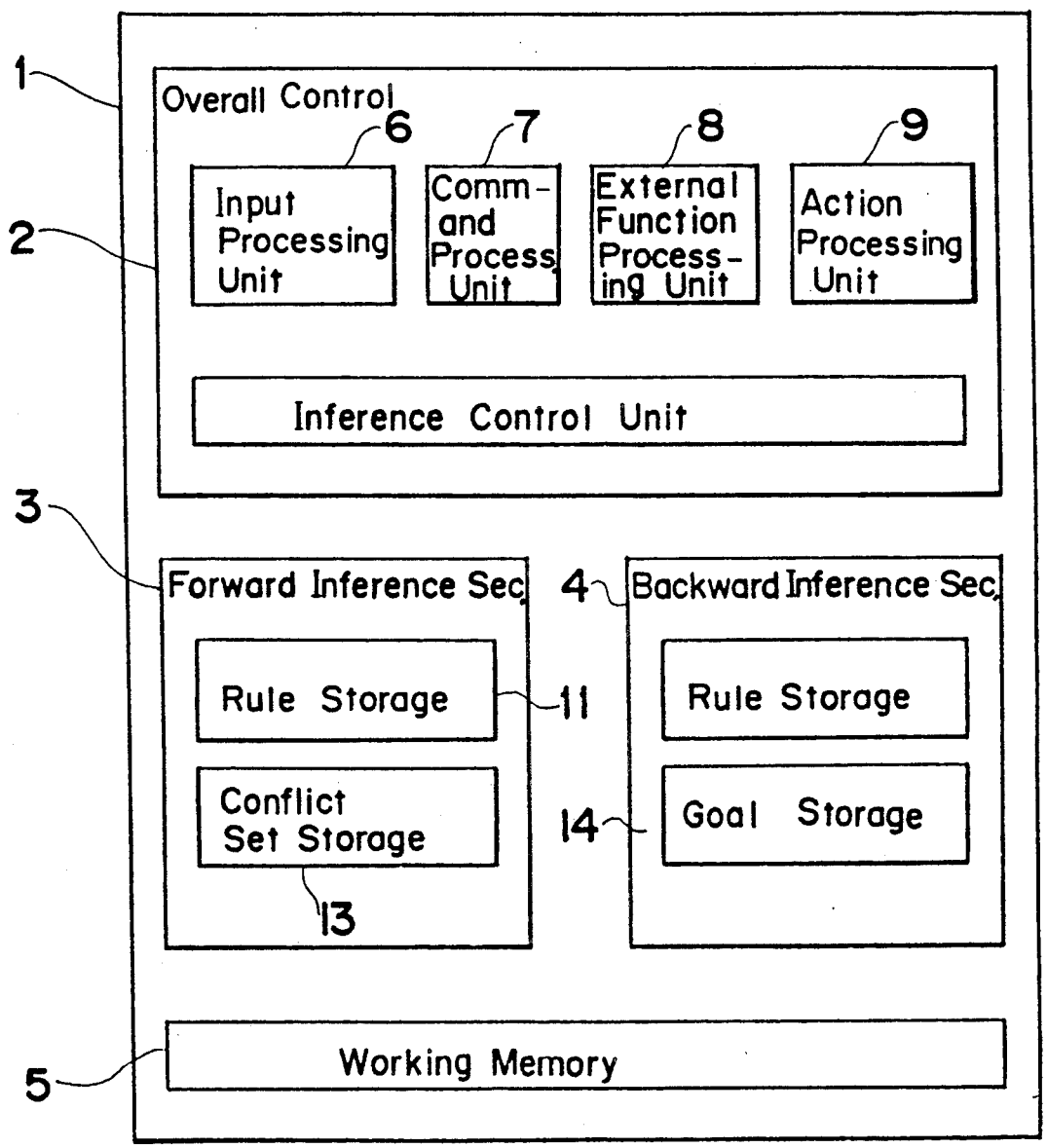
FIG. 1 is a block diagram illustrating the structure of an interrogating device according to one embodiment of the present invention.

FIG. 1 is a block diagram which illustrates the structure of an interrogating device 1 having both a forward inference control mechanism and a backward inference control mechanism. The interrogating device 1 includes an overall control unit 2, a forward inference section 3, a backward inference section 4 and a working memory 5.

The overall control unit 2 is operable to start or terminate an interrogating operation, which will be described later, to execute a forward/backward inference control, to analyze an input data, to process a command relative to the interrogating device 1, and to process actions obtained from the inference during the execution.

In other words, an input processing unit 6 is operable to read and analyze files containing facts and rules separately complied by a program synthesizing device (not shown) so that the contents of the files can be classified into facts, forward inference rules, backward inference rules and commands relative to the interrogating device 1. When a result of the classification is facts, the facts are stored in a working memory 5; when a result of the classification is the forward inference rules, the forward interference rules are stored in a rule storage 11 of the forward inference section 3; when a result of the classification is the backward inference rules, the backward inference rules are stored in a rule storage 12 of the backward inference section 4; and when a result of the classification is a command, the command processing unit 7 is called. By so doing, the command processing unit 7 executes, depending on the contents of the command, a process of starting the inference and a processing of issuing a command to the interrogating device 1 from the outside, such as the display of the contents of the working memory 5 and the specification of a strategy. By way of example, when a command instructing the start of the inference is inputted, an inference control unit 10 is called for the execution of the inference. An external function processing unit 8 performs a process which is executed when an external function is called during the execution of the inference. An action processing unit 9 is operable to perform an action which takes place during the forward inference or the backward inference as will be described later.

The forward inference section 3 performs a comparison between the fact stored in the working memory 5 and the rules stored in the rule storage 11 to synthesize a conflict set consisting of the rule and the corresponding fact which have satisfied a condition, and the conflict set is subsequently stored in a conflict set storage 13. Then, by a conflict resolution, one of the rules is selected from the conflict set and the action of a conclusion portion of the selected rule is executed.

The backward inference section 4 is operable to set up a goal according to the rules stored in the rule storage 12 for the backward inference and to refer to the working memory 5 for the determination of whether or not the goal has been established.

Where interrogation is performed with the use of the interrogating device 1 of the above described construction, the following procedures are taken.

(1) By a program synthesizing device, which is not illustrated a file consisting of the fact and the rule is prepared.

(2) The contents of this file are analyzed by the interrogating device 1 and are stored in a storage device (the rule storages 11 and 12 and the working memory 5 are illustrated in FIG. 1).

(3) With the use of the fact and the rules stored in the storage device 11, 12 and 5, the inference is executed as will be described later. If the inference does not function properly, the above procedure (1) is initiated.

The present embodiment relates to what sentence construction is used to synthesize a file of knowledge during the procedure (1), to how conversion is made for the storage in the rule storages 11 and 12 and also in the working memory 5 during the procedure (2), and to how the inference is executed during the procedure (3).

(A) Sentence Construction of Knowledge

There is a fact and a rule in the above described knowledge. Hereinafter, the sentence construction of each fact and rule will be discussed. The accuracy in the illustrated embodiment is expressed by an integer value within the range of −100 to 100.

An example of the sentence construction of the fact in the file of knowledge is illustrated in Table 1 below.

TABLE 1

| There is a fever | ; |
| The name of a disease is cold | 80 ; |
| The name of a disease is pneumonia | −50 ; |
| ! The name of a disease is pneumonia | 50 ; |

In the example for the four facts illustrated in Table 1, the first fact is "There is a fever" which represents a pattern of fact (as will be described later) with ";" indicating the end of the fact. If no numeral exist in front of ";", the accuracy of the fact is 100 and such a fact is treated as a decisive fact. The second fact indicates that the accuracy of the fact, "The illness is a cold", is 80. The third fact indicates the accuracy of the fact. "The illness is pneumonia", is −50. If the accuracy is indicated by a negative numeral, it means that the fact is denied. The fourth fact is a negative form of the third fact. The symbol "!" placed at the head of the sentence indicates a negation. The third and fourth facts are totally and equally treated.

A type of existence relative to the fact is void. The existence/void is attached to each condition within the condition section of the rules as will be described and is used for the determination of whether or not such conditions are established.

An example of the sentence construction of the rule in the knowledge file is illustrated in Table 2.

TABLE 2

```
<Diagnosis of Cold> 100
If
        there is a fever
        there is a quivering
        — The name of a disease is a cold
    then,
        (display "The illness appears a cold")
        (make The illness is a cold)    80    ;
```

The rule includes the rule designation "<Diagnosis of Cold>", the priority "100", the condition section "If . . . ", the conclusion section "then", and the accuracy "80", with the end of one rule being represented by ";". The priority of this rule is 100. The priority in the illustrated embodiment can take any value within the range from −32,768 to 32,767 and will take zero (0) if the description is omitted. Accordingly, the rule illustrated in Table 2 above is given priority to the other rule in which the priority is omitted. The accuracy may be omitted. If the accuracy is omitted, the accuracy will be regarded 100 as described above. In the example illustrated in Table 2, the accuracy is 80. The accuracy of the rule being 80 means "the accuracy of the fact newly added in the case where one of the accuracies of the facts matching with each condition in the condition section and stored in the working memory 5 is 80. The symbol "—" used in the third condition in the above rule indicates that, if the fact "The illness is a cold" is not stored in the working memory 5, this condition is true.

(B) Storing Method

The fact and rule of the above described sentence construction are stored in the working memory 5 and the rule storage 11 or 12, respectively, by the input processing performed by the input processing unit 6 illustrated in FIG. 1.

A method of storing the fact in the working memory 5 will first be described. By way of example, the four facts shown in Table 1 are stored in the form of such structures as illustrated in FIG. 2. In the interrogating device 1 for the illustrated embodiment, in order to maximize the efficiency of the memory, there is provided a region in which a case structure of the fact is separately stored. In an entry for the case structure of the working memory 5, numbers of arrangement for case structures corresponding to the regions, which have the actual case structures stored, are allocated. Moreover, accuracies, flags and pointers are allocated to the working memory 5.

Referring to FIG. 2, the case structure 1 in the first entry represents a structure of the fact "There is —", while the case structure 2 represents a structure of the fact "It is—". The numbers of arrangement of the corresponding case structures as described above are stored in the actual working memory 5. The flag in the third entry is a flag used to express whether each element in the working memory 5 is affirmative or whether each element in the working memory 5 is negative. The number of arrangement (or address) of the case structure is entered in the pointer at the last entry.

Hereinafter, a method of storing the rule in the rule storage 11 or 12 will be described. By way of example, the rules illustrated in Table 2 are stored in the rule storages 11 and 12 in the form of such structures as illustrated in FIG. 3. In the illustrated embodiment, as is the case with the fact, in order to maximize the efficiency of the memory, the condition section and the conclusion section of the rules are stored in respective regions, and the condition section and the conclusion section store respective pointers indicative of the position of the condition section and that of the conclusion section corresponding respectively to the above described regions. Only a structure which constitutes the heart of the rule is illustrated here.

Although the rule storages 11 and 12 for the forward and backward inferences, respectively, are illustrated separately in FIG. 1, the reality is that a common region is occupied by the forward and backward inference rules, and, depending on the type of inference rule in the second entry in FIG. 3, the forward inference rule and the backward inference rule are separated. Also, a flag, which is indicative of whether or not the above described rule is deleted, is given the uppermost entry of the structure. This is a hit flag and may share with the region common to the above described type.

Figure 4:
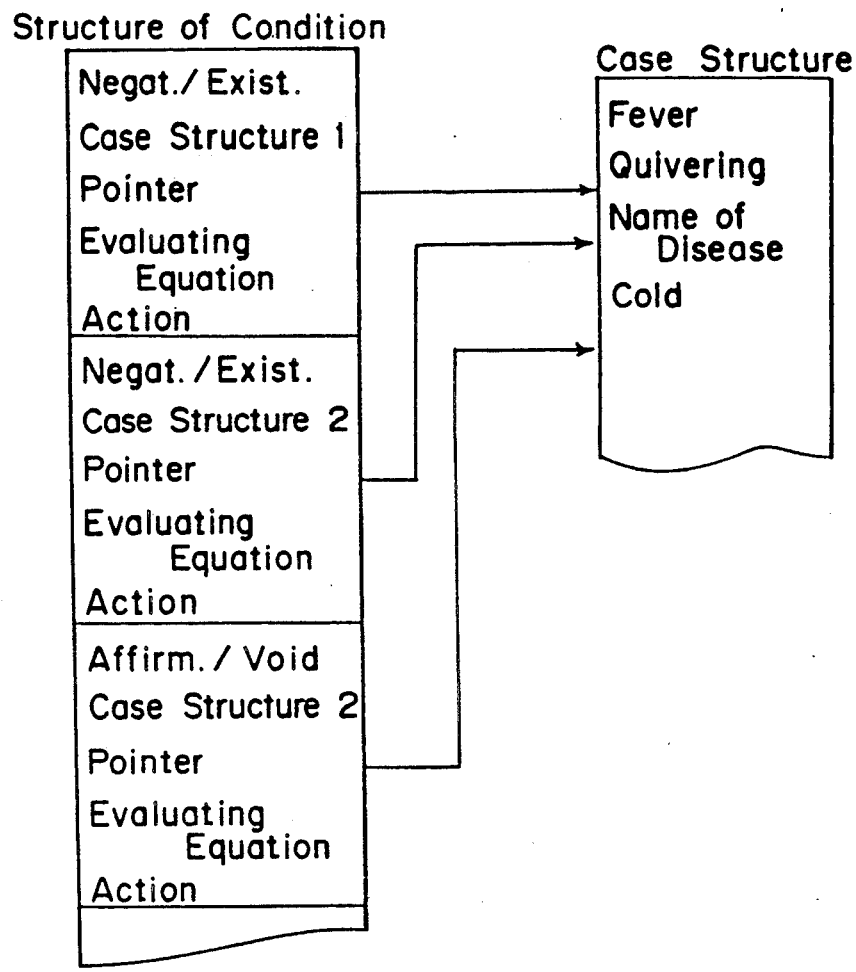
FIG. 4 is a diagram illustrating a storage structure of a condition unit of the rules.

A method of storing conditions of the rule will now be discussed. The structure for storage of the conditions is illustrated in FIG. 4. This is a structure in a region pointed out by the point of the condition in the structure of the rule illustrated in FIG. 3. The structure of the conditions is, as is the case with the structure of the facts, stored with case structures separated in respective regions. The first entry of the structure of the conditions represents the type of condition. The above type is weighed by bit-to-bit in the memory. "Negation" ("Negat." in FIG. 4) is the same as the negation of the fact described above. "Existence" ("Exist." in FIG.4) indicates the establishment of a condition if the fact which matches with such a condition exists in the working memory 5. On the other hand, "Void" indicates that a condition is established if the fact that matches with such a condition does not exist in the working memory 5. The respective entries for the case structure and the pointer are the same as described above in connection with those for the fact. The entry for the evaluating equation is used in the case where the condition makes use of a variable and there is some limitation to the variable. The content actually stored in the entry of the evaluating equation is a pointer towards a structure of the equation. The entry of the action is used in the backward inference and stores a pointer towards the structure of action in which no manipulation of the working memory 5 is carried out.

Figure 5:
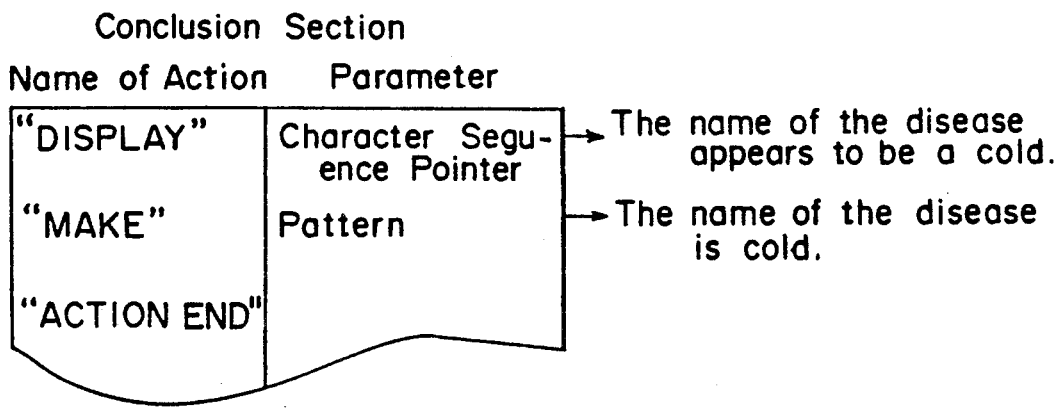
FIG. 5 is a diagram illustrating a storage structure of a conclusion unit of the rules.

A method of storing the conclusion section of the rule will now be described. In the rule structure illustrated in FIG. 3, a structure of a region is directed to a pointer of the conclusion section. As illustrated in FIG. 5, the action in the conclusion section includes the name of the action and a parameter. The action in the example illustrated in Table 2 is "DISPLAY" and "MAKE" of the fact. In case of the display, since the display of the parameters and the display of the character sequence are processed separately a value of "DISPLAY" is entered in the case of the display for the character sequence. In the case for the addition of the fact, a value of "MAKE" is entered. Finally, "ACTION END" is entered.

"DISPLAY", "MAKE", AND "ACTION END" are in fact integer values and, in the illustrated embodiment, they are expressed respectively by the character sequences. In practice, however, 1, 2 and 0 are respectively allocated to "DISPLAY", "MAKE" and "ACTION END".

Hereinafter, the action for changing the priority and the action for deleting or restoring of the rules according to an embodiment of the present invention will be discussed.

In the first place, the action for changing the priority of the rules will be described. In Table 3, the sentence construction of the action for changing the priority of the rules from 100 to 20 is illustrated.

TABLE 3

(priority Diagnosis of Cold 20)

"Priority" is the name of the action for changing the priority of the rules. A parameter is the name of the rule and a new priority. The structure of storage of Table 3 is illustrated in FIG. 6. When the number of the parameters is 2 or more, the serial numbers (in the illustrated embodiment, "PRIORITY" is used above instead) are successively used in this way.

The action for deleting the rules will now be described. Table 4 below illustrates the sentence construction of the action for the deleting the rules.

TABLE 4

(excise Diagnosis of Cold)

"Excise" is the name of the action for deleting the rule. A parameter is the name of the rule. The structure of storage of Table 4 is illustrated in FIG. 7.

When the action for the deletion of the rule is executed, a flag in the uppermost entry illustrated in FIG. 3 is set to a deletion side.

Finally, the action for restoring the rule will be described. The structure of the action for restoring the rule of Table 2 deleted during the action of Table 4 is illustrated in Table 5 below.

TABLE 5

(resume Diagnosis of Cold)

"Resume" is the name of the action for restoring the rule. A parameter is the name of the rule. The structure of storage of Table 5 is illustrated in FIG. 8.

By merely the sentence constructions of the actions for the change of the priority for the rule, the deletion of the rule and the restoration of the rule in the conclusion section of the rule or the condition section, the change of the priority, the deletion of the rule and the restoration of the rule can be easily accomplished. (C) Execution of Forward Inference The forward inference is executed by the following procedures.

(1) A comparison is made between each condition in the condition section of the rules and the fact in the working memory 5 so that the rule can be selected in which all of the conditions are satisfied. At this time, if there is a plurality of sets of facts in the working memory 5 with respect to a certain rule which satisfy the condition section, the sets are distinguished. The rule which has been selected as a result of the establishment of the conditions is hereinafter referred to as an executable rule. A set of this executable rule and the fact corresponding thereto is called a conflict set.

(2) Only one set is selected as the conflict set during the procedure (1) above. The selection of only one set as the conflict set is called a conflict resolution, and the manner of selecting when the selection is made called a strategy of the conflict resolution, or simply a strategy. When there is no conflict set, the inference is terminated.

(3) The conclusion section of the rule, which has been selected as a result of the conflict resolution, is executed. This is referred to as a firing of the rule, or simply a firing. After the firing, the procedure (1) above is initiated.

Each time the rule is executed, a comparison is made between the next succeeding rule and the working memory 5. However, a combination of the rule, which has previously been fired, and the fact in the working memory 5 will no longer be added to the conflict set.

(C-1) Matching

With respect to each condition of the rule and the fact in the working memory 5, comparisons of the pattern, the accuracy and the affirmative/negative are carried out in the following manner.

(i) The pattern is checked to determine whether the pattern matches with each other. The pattern refers to a combination of a case construction, such as "There is . . .", and a value "fever "in the sentence "There is a fever". A variable may be used as a condition and, in such a case, a check is made with the use of a value, confined by the variable, to determine if the pattern matches with each other.

(ii) By combining the accuracy and the affirmative/negative, the matching is determined according to Table 6 below.

TABLE 6

| Matching | Condition | Elements in the Working Memory | |
|---|---|---|---|
| Success | Affirmative | Affirmative | 20 < = Accuracy |
| Failure | Affirmative | Affirmative | Accuracy < 20 |
| Success | Affirmative | Negative | Accuracy < = −20 |
| Failure | Affirmative | Negative | −20 < Accuracy |
| Success | Negative | Affirmative | Accuracy < = −20 |
| Failure | Negative | Affirmative | −20 < Accuracy |
| Success | Negative | Negative | 20 < = Accuracy |
| Failure | Negative | Negative | Accuracy < 20 |

(iii) If the condition is "void", the sucess and failure are reversed.

In this way, when all of the conditions in the rule are established, sets of the established rules and the facts in the working memory are registered in the conflict set storage 13 in the forward inference section 3 illustrated in FIG. 3. The structure of elements of the conflict set includes the rule number, the number of the elements of the working memory 5 which have matched, the confinement of the variable during the matching and the pointer for arranging according to the strategy. This structure of storage is prepared for each rule, which has been matched, and the fact in the working memory 5.

In the illustrated embodiment, the matching is similarly performed with respect to the rule which has been deleted. This is for the purpose of avoiding any possible interruption of the inference which would be caused by matching with a large amount of data in the event that the rule is subsequently restored after the rule has been deleted.

(C-2) Conflict Resolution

The elements of the conflict set prepared in (C-1) are arranged according to the strategy at that time. In the illustrated embodiment, the arrangement is carried out after time, the element is determined, not after all of the elements have been determined. The elements so determined are successively inserted in a list of elements. The elements are chained together as illustrated in FIG. 10 by respective pointers.

Where a new element is made, the new element is inserted in the chain of the elements by the following procedures.

(a) The heading element of the conflict set is rendered subject to a comparison.

(b) A comparison is made between the new element and the heading element according to the current strategy.

(c) If priority is given to the new element as a resault thereof, the new element is inserted in front of the element, which is rendered subject to a comparison, followed by the termination.

(d) If priority is not given to the new element, the new element is again compared with next suceeding element. If there is no element with which the new element is to be compared, the new element is inserted subsequent to the last element, and the termination follows.

(e) Return to (b).

In the illustrated embodiment, when the comparison is made at (b), the comparison is made in terms of the priority of the rule. When the priority is the same, comparison is performed according to a specified strategy.

(C-3) Execution of Rule

At the time the conflict resolution terminates at (C-2), one of the elements of the conflict set is selected and the conclusion section of the rule thereof is executed according to the rule number thereof. In the illustrated embodiment, although the conflict set is in the form of a list arranged according to the strategy, they are included in the conflict set with respect to the rules deleted. Because of this, reference is made to the type of the structure for the rules illustrated in FIG. 3 to determine if it is a rule which is not deleted sequentially from the heading of the conflict set, and the conclusion section of the initial rule not deleted is executed.

Where "priority" and "strategy" are executed in the action of the conclusion section, the strategy is then changed. For this purpose, the sequence of numbering the elements of the conflict set has to be changed. Because the conflict set is in the form of a chain as illustrated in FIG. 10, these elements have to be divided so that a new chain can be prepared according to the procedure (C-2).

(D) Backward Inference

The case of the backward inference will now be described. Table 7 below illustrates the sentence construction of the rule when the action fro changing the priority of, for example, the forward inference in the backward inference is employed.

TABLE 7

<Backward Diagnosis of Cold>

If
    there is a fever
    there is a quivering
    (priority Diagnosis of Cold 20)
    — The name of the disease is cold
    (display "The name of the disease appears to be cold")
then,
    the name of the diseases is cold   80  ;

Where the backward inference rule illustrated in Table 7 is to be stored, a pointer towards the structure of the action stored in a separate region is accomodated in an entry of the action of the elements for the condition of FIG. 4 corresponding to the action of the condition section of Table 7.

When the backward inference is to be executed, if the matching in the order of the conditions is successful, one goes to the next succeeding condition. Accordingly, the action (priority Diagnosis of Cold 20) is executed after the matching of the condition "there is a quivering" has been successful.

In this way, by adding the respective actions for changing the priority, deleting the rule and restoring the rule to the condition section of the backward inference, change of priority from the backwatd inference to the forward inference, and the deletion and restoration of the rule can be easily accomplished.

From the foregoing description, the interrogating device includes a rule memory for storing forward inference rules, which are used in a forward inference control system, and backward inference rules, which are used in a backward inference control system, a working memory for storing facts, a forward inference control unit for adding or deleting the fact relative to the working memory according to the forward inference rule and a backward inference control unit for conducting a search according to the backward inference rule, in which a device priority is given to the forward inference rule stored in the rule memory. Whereby, a command is added to a predetermined rule of one of the forward inference rules and the backward inference rules stored in the rule memory, where command is necessary to perform one of functions of changing the priority added to the forward inference rules, deleting the rule and restoring the rule. In the forward inference control system, the change of the priority for the forward inference rules, the deletion of the rule and the restoration of the rule is enabled by the forward inference control unit. In the forward and backward inference control systems, the change of the priority for the forward inference rules, the deletion of the rule and the restoration of the rule is enabled by the backward inference control unit. Accordingly, no special fact is necessary for controlling the change of the priority for the rule and the deletion of the rule. Therefore the change of the priority for the foward inference rules, the deletion of the rule and the restoration of the rule may be easily accomplished by the action of the forward inference rule or the backward inference rule.

Thus, in the forward inference control system, the change of the priority of the forward inference rule, the deletion of the rule and the restoration of the rule may be accomplished by the forward inference control unit. Also, in the forward and backward inference control systems, the change of the priority of the forward inference rule, the deletion of the rule and the restoration of the rule may be accomplished by the backward inference control unit.

Although the present invention has been fully described in connection with the preferred embodiments thereof with reference to the accompanying drawings, it is to be noted that various changes and modifications may be apparent to those skilled in the art. Such changes and modifications are to be understood as included within the scope of the present invention as defined by the appended claims.

What is claimed is:

1. An interrogating device having a forward inference control system and a backward inference control system, comprising:

input processing means for reading data and classifying the data into forward inference rules having forward condition sections corresponding to each of said forward inference rules, backward inference rules having backward condition section corresponding to each of said backward inference rules, affirmation facts, negation facts and commands;

a rule memory for storing said forward inference rules and said backward inference rules;

a working memory for storing said affirmation facts and said negation facts;

forward inference control means for adding said affirmation and negation facts to said working memory and selecting said affirmation and negation facts from said working memory in response to said forward inference rules;

backward inference control means for searching said backward condition sections according to said forward and backward inference rules in a sequence of said forward inference rules and then said backward inference rules; and inference control means for enabling said forward inference control means and said backward inference control means in response to said commands, said commands being applied to a predetermined rule having a priority for said forward and backward inference rules stored in said rule memory for changing the priority of said predetermined rule, deleting said predetermined rule or restoring said predetermined rule;

wherein said forward inference control means changes the priority of said predetermined rules, deletes said predetermined rule and restores said predetermined rule in the device or said backward inference control means changes toe priority of said predetermined rile, deletes said predetermined rule and restored said predetermined rule in the device so that changing the priority of said predetermined rule, deleting said predetermined rule and restoring said predetermined rule may be accomplished by either said forward inference rules or said backward inference rules.

2. A method for performing a forward inference analusis and a backward inference analysis in a interrogating device, comprising the steps of:
(a) reading data into the interrogating device;
(b) classifying the data into affirmation facts, negation facts, forward inference rules having forward condition sections and backward inference rules having backward condition sections;
(c) storing said affirmation facts and said negation facts in a working memory;
(d) storing said forward inference rules and said backward inference rules in a rule memory; (e) inputting commands into the interrogating device which change priorities of said forward inference rules and delete or restore said forward inference rules;
(f) comparing said forward condition sections with said affirmation facts and said negation facts stored in said working memory;
(g) collecting said forward inference rules having said forward condition sections match with said affirmation facts and said negation facts at said step (f);
(h) selecting one of said forward inference rules with the highest priority when at least one forward inference rules is collected at said step (g);
(i) executing said commands in an action section of the rules, said command including adding or deleting to said working memory, changing the priority of said forward inference rules and deleting or restoring said forward inference rules when said one forward inference rule is selected at said step (h);
(j) determining whether one of said backward inference rules matches with a goal;
(k) executing said backward inference rules and returning to said step (f) when one of said backward inference rules is determined to match said goal at step (j); and
(l) returning to said step (e) when said backward inference rules fail to match with said goal as determined at said step (j).

* * * * *